(12) United States Patent
Hayashida et al.

(10) Patent No.: US 7,013,576 B2
(45) Date of Patent: Mar. 21, 2006

(54) MEASURING DEVICE USING MULTI-START THREADED SPINDLE

(75) Inventors: Shuuji Hayashida, Kawasaki (JP); Kouji Sasaki, Kawasaki (JP); Yuichi Ichikawa, Kawasaki (JP); Osamu Saito, Kawasaki (JP); Seigo Takahashi, Kawasaki (JP); Masamichi Suzuki, Kawasaki (JP); Tetsuya Nakadoi, Higashihiroshima (JP); Masahiko Tachikake, Higashihiroshima (JP); Takahiro Nakamura, Higashihiroshima (JP); Masafumi Okamoto, Higashihiroshima (JP); Yuuzou Hashimoto, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 57 days.

(21) Appl. No.: 10/327,976

(22) Filed: Dec. 26, 2002

(65) Prior Publication Data

US 2003/0121169 A1  Jul. 3, 2003

(30) Foreign Application Priority Data

Dec. 28, 2001 (JP) ............................. 2001-401881

(51) Int. Cl.
*G01B 3/18* (2006.01)

(52) U.S. Cl. .............................. 33/813; 33/820; 33/831

(58) Field of Classification Search ................... 33/783, 33/784, 792, 819, 820, 813, 814, 816, 831, 33/821, 822; 411/412

See application file for complete search history.

(56) References Cited

U.S. PATENT DOCUMENTS

| 1,940,475 | A | * | 12/1933 | Witchger et al. | .............. 33/816 |
| 2,338,001 | A | * | 12/1943 | La Vigne | ...................... 33/813 |
| 2,461,995 | A | * | 2/1949 | Modes | ........................ 33/814 |
| 2,560,850 | A | * | 7/1951 | Day | .............................. 33/813 |
| 2,979,826 | A | * | 4/1961 | Zabler et al. | .................. 33/816 |
| 3,047,956 | A | * | 8/1962 | German | ....................... 33/535 |
| 3,120,061 | A | * | 2/1964 | Pfleiderer | ..................... 33/817 |

(Continued)

FOREIGN PATENT DOCUMENTS

| EP | 0 646 764 A2 | 4/1994 |
| GB | 1 557 792 | 12/1979 |

(Continued)

*Primary Examiner*—R. Alexander Smith
(74) *Attorney, Agent, or Firm*—Oliff & Berridge, PLC

(57) ABSTRACT

Provided is a measuring device 1 for measuring the size of an object comprising a body 2, and a spindle 3 which is screwed into the body 2 and axially advances and retracts by screwing with respect to the body 2, the measurement being based on the axial displacement of the spindle 3 effected by the revolution of the spindle, wherein the spindle is screwed into the body 2 via a multiple-start thread 31. Therefore, it is possible to displace the spindle 3 at a high speed, which improves the operability of the measuring device.

8 Claims, 5 Drawing Sheets

U.S. PATENT DOCUMENTS

| | | | | |
|---|---|---|---|---|
| 3,727,318 A | * | 4/1973 | Meier | 33/814 |
| 3,750,296 A | * | 8/1973 | Kindl et al. | 33/816 |
| 3,781,998 A | * | 1/1974 | Okazaki | 33/819 |
| 3,793,733 A | * | 2/1974 | Nishikata | 33/819 |
| 3,971,137 A | * | 7/1976 | Fernandez | 33/814 |
| 4,062,120 A | * | 12/1977 | Lacagnina et al. | 33/819 |
| 4,174,575 A | * | 11/1979 | Nakata | 33/710 |
| 4,207,679 A | * | 6/1980 | Poage | 33/819 |
| 4,255,861 A | * | 3/1981 | Nakata et al. | 33/819 |
| 4,550,507 A | | 11/1985 | Nishikata | |
| 5,253,431 A | * | 10/1993 | Smith | 33/810 |
| 5,288,292 A | * | 2/1994 | Giraud et al. | 606/166 |
| 5,829,155 A | * | 11/1998 | Takahashi et al. | 33/813 |
| 2003/0121169 A1 | * | 7/2003 | Hayashida et al. | 33/813 |
| 2004/0250439 A1 | * | 12/2004 | Hayashida et al. | 33/813 |

FOREIGN PATENT DOCUMENTS

| | | |
|---|---|---|
| JP | A 01-307563 | 12/1989 |
| JP | A 07-146101 | 6/1995 |

* cited by examiner

MEASURING DEVICE USING MULTI-START THREADED SPINDLE

BACKGROUND OF THE INVENTION

1. Field of the Invention

The present invention relates to a measuring device for measuring the size of an object by advancing or retracting a spindle by screwing with respect to the object, that is, a measuring device represented, for example, by micrometers and micrometer heads.

2. Description of Related Art

A conventionally known measuring device represented, for example, by micrometers and micrometer heads consists of a body with a female thread and a spindle with a male thread, the female and male threads engaging with each other, and measures the size of an object by advancing or retracting the spindle with respect to the object via screwing dependent on the engagement of the two threads.

With such a measuring device, the axial displacement for each revolution of the spindle (single turn axial displacement) is determined by the pitch of male threads inscribed on the spindle.

The male threads on the spindle of a conventional measuring device generally have a pitch of 0.5 or 0.635 mm.

Some measuring devices have been known that have a spindle whose thread has au enlarged pitch to increase its single turn axial displacement.

With a measuring device whose spindle has a male thread with a pitch of 0.5 or 0.635 mm, however, measurement becomes very cumbersome if the measuring device must measure many objects different in size successively, because then the spindle must travel a considerable distance each time one object is exchanged for another, and the spindle must be revolved many times to cover the distance because of its single turn axial displacement being small.

To meet such inconvenience, if the thread of a spindle is made to have a larger pitch, the axial interval between the ridge and trough of each thread must be increased, and for this purpose a sufficiently large amount of material constituting the spindle must be bitten away during preparation of the spindle. This will in turn lead to the reduced strength of the spindle. Such a spindle is prone to bend during preparation, and thus may cause the precise machination of threads to be impaired.

Moreover, if the thread of a spindle is made to have a large pitch while other things being kept invariable, the number of male threads on the spindle to engage with the female threads on a body will be reduced, which may reduce the resistance of the threads against a force applied on the axis of the spindle, and thus may cause the precision of axial displacement of the spindle to be impaired. This problem may be circumvented by increasing the length of the male and female threads such that the number of male threads to engage with the female threads remains invariable. However, such countermeasure will cause the overall size of the measuring device to be increased.

SUMMARY OF THE INVENTION

The main object of the present invention is to resolve the problems inherent to conventional measuring devices by providing a measuring device enabling one to concurrently achieve high precision measurement and high-speed displacement of a spindle.

The present invention provides a measuring device for measuring the size of an object comprising a body, and a spindle which is screwed into the body and axially advances and retracts by screwing with respect to the body, the measurement being based on the axial displacement of the spindle achieved via the revolution of the spindle which allows the spindle to advance or retract with respect to the body via screwing based on a multiple-start thread.

According to the measuring device configured as above, when the spindle is revolved, the spindle axially advances or retracts with respect to the body by screwing. If the number of revolutions the spindle undergoes for a given measurement is determined, the axial displacement of the spindle can be determined based on its single turn axial displacement, which then gives the measurement.

According to the present measuring device, because the spindle is screwed into the body via a multiple-start thread, it is possible to increase the single turn axial displacement of the spindle if the revolution speed is assumed to be constant, with the present micrometer, the spindle will move higher than does a conventional micrometer based on a single-start thread. This will ensure good operability of the measuring device. Even if it is required to measure many objects different in size successively which will need considerable displacement of the spindle each time one object is exchanged for another, the present measuring device will allow one to advance or retract the spindle at a high speed as needed in accordance with a current object to be measured. This will reduce the time and cost required for measurement.

Take a single-start thread having a unit pitch. Then, consider a three-start thread having a three-unit pitch, and a single-start thread having a three-unit pitch. With the three-start thread having a three-unit pitch, the axial interval between the ridge and trough of each start thread is practically the same with the corresponding interval observed in the single-start thread having a unit pitch. In contrast, with the single-start thread having a three-unit pitch, the axial interval between the ridge and trough of each start thread is three times as wide as that of the single-start thread having a unit pitch. This consideration applies to any multiple-start thread. Therefore, with a multiple-start thread configured as above, it is not necessary to remove any extra amount of material constituting the spindle during preparation on account of the increased pitch of threads, and thus the strength of the spindle is not impaired. With a multiple-start thread, the number of male threads on the spindle to engage with the female threads on a body will not be reduced even if the pitch is increased. Therefore, the resistance of the threads against a force applied on the axis of the spindle is maintained, and the precision of axial displacement of the spindle is insured.

According to the present invention, preferred is a measuring device comprising a body having a U-shaped frame with an anvil on its distal end; a spindle which is screwed into the proximal end of the body and moves by screwing towards or away from the anvil; a detection means for detecting the axial displacement of the spindle from the revolution of the spindle; and a display means for displaying a measurement based on a detection signal from the detection means, wherein the spindle is screwed into the body via a multiple-start thread.

According to the measuring device configured as above, in measuring the size of an object, if the spindle must be moved considerably from a position at which it is kept in contact with the anvil to a measurement position where it holds the object in cooperation with the anvil, the advantage obtained from the invention will be ensured, because the travel occurs at a high speed on account of the spindle being screwed into the body via a multiple-start thread. Namely, the measuring device will allow one to advance or retract the spindle at a high speed as needed in accordance with an object to be measured. This will reduce the time and cost required for measurement.

According to the present invention, the detection means preferably comprises a stator attached to the body; a rotor placed opposite to the stator; a fastening groove axially inscribed on the spindle; a fastening pin arched to the rotor so as to fit to the fastening groove; and a pressing means for pressing the fastening pin towards the fastening groove.

According to the above feature, if the spindle is revolved, the revolution is transmitted to the rotor via the fastening pin, which fits to the fastening groove. An angle by which the rotor rotates relative to the stator is read out by the stator, and a rotational angle of the spindle 3 is determined based on the read-out value. The axial displacement of the spindle is calculated based on the rotational angle and the single turn axial displacement.

Because the fastening pin is pressed towards the fastening groove, it is possible to closely fit the fastening pin to the fastening groove with no gap inserted in between. Thus, the revolution of the spindle is exactly transmitted to the rotor, which helps the detection means to precisely determine the rotational angle of the spindle, and to minimize error. This will contribute to the improved precision of the micrometer.

If the spindle revolves via a multiple-start thread, and comes to have a large single turn axial displacement the precision of the detection means must be increased in order to maintain the precision of measurement. If any redundant gap exists between the fastening pin and the fastening groove, it will greatly affect the precision of measurement, no matter how small it may be. However, with the measuring device of the present invention, the fastening pin is closely fitted to the fastening groove being pressed by the pressing means, such redundant gap can be safely eliminated and the precision of measurement is reliably maintained.

According to the present invention, preferably the fastening pin is attached to the rotor such that it can be slid in a direction vertical to the long axis of the spindle, and the pressing means has one end attached to the rotor and the other end in the form of a plate spring which presses the fastening pin towards the fastening groove.

According to the above feature, because the fastening pin is pressed into the fastening groove being forced by the elasticity of the plate spring, the fastening pin is closely fitted to the fastening groove with no gap inserted in between while the fastening pin being able to slid along the fastening groove with friction. Therefore, the revolution of the spindle is precisely transmitted to the rotor. As a result, error associated in the reading of the rotational angle of the spindle by the detection means can be minimized, and the precision of measurement is improved.

According to the present invention, preferably the fastening groove has a V-shaped profile, and the tip end of the fastening pin that comes into contact with the fastening groove takes a spherical shape.

According to the above feature, because the V-shaped groove has a wide opening with respect to its closed bottom, the tip end of the fastening pin intimately comes into contact with the sidewalls of the groove with no gaps inserted in between. When the pin comes into contact with the groove, it contacts with the latter at points, and thus frictions working at those points are small even when the pin moves along the groove. Therefore, the fastening pin is closely fitted to the fastening groove with no gap inserted in between while the fastening pin being able to slid along the fastening groove with negligible friction. Therefore, the measurement precision of the measuring device is improved.

DETAILED DESCRIPTION OF PREFERRED EMBODIMENT(S)

An embodiment of the present invention will be described below with reference to attached figures.

Figure 1:
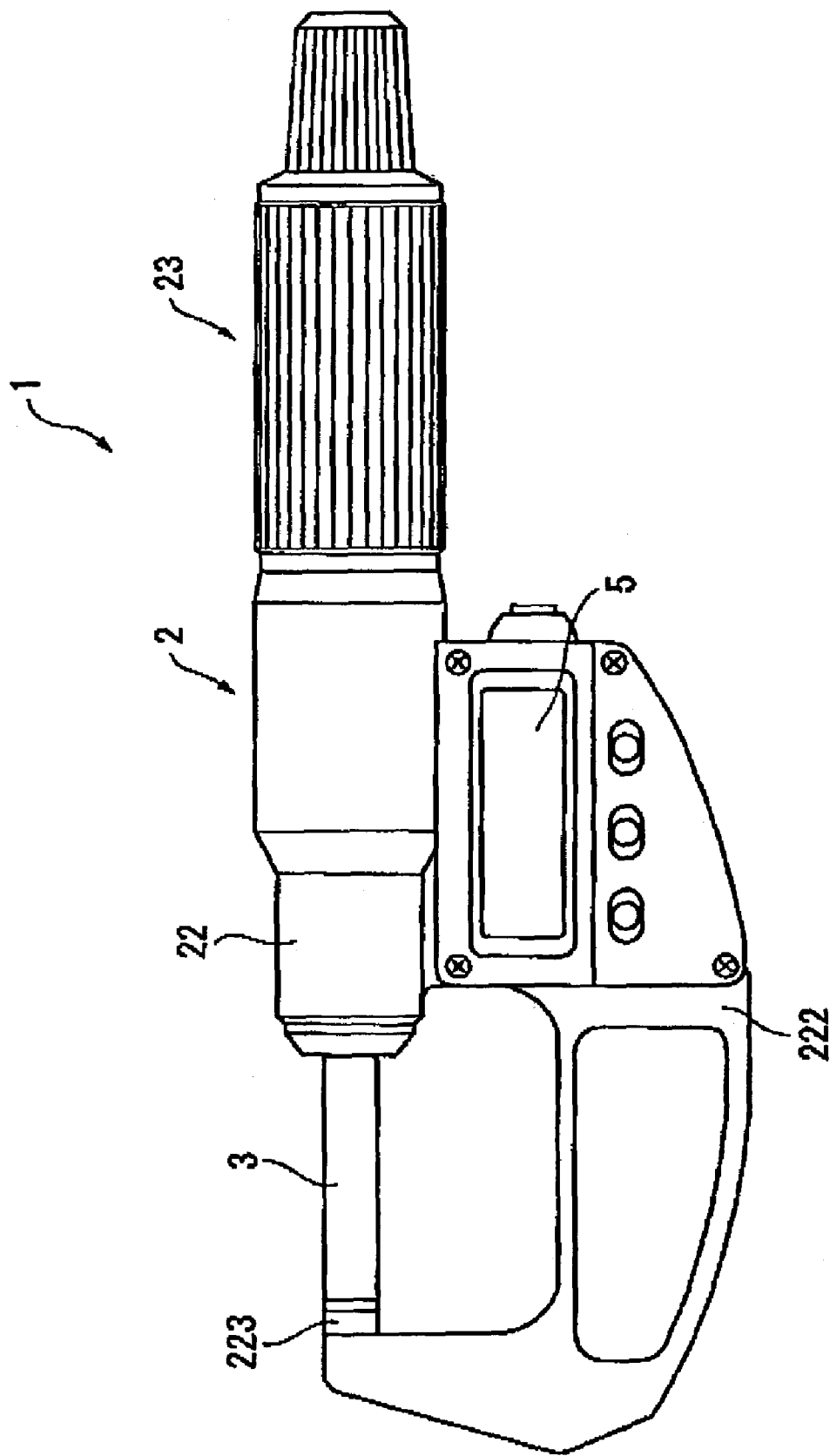
FIG. 1 shows a micrometer representing a first embodiment of the present invention.
Figure 2:
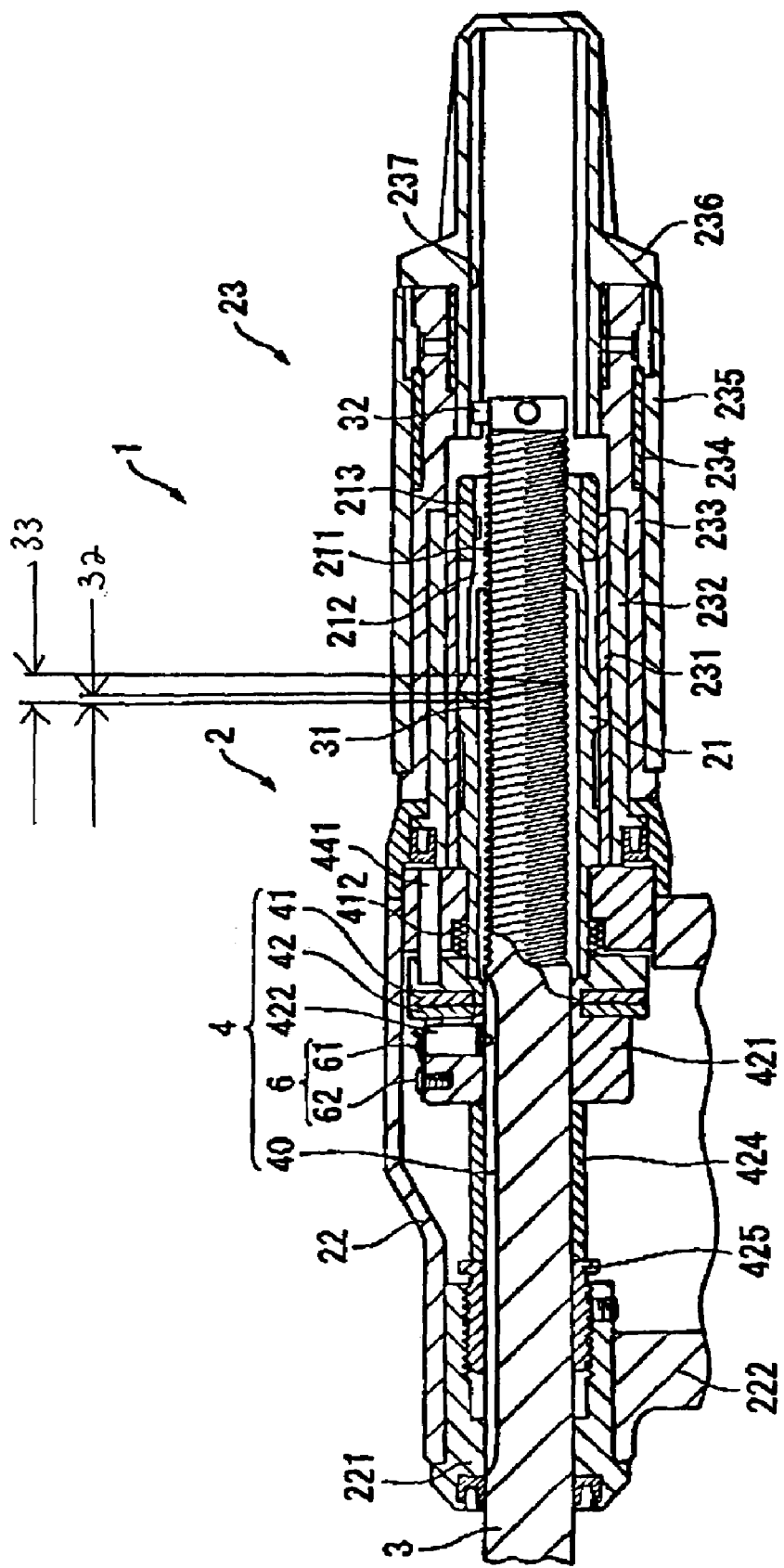
FIG. 2 is a sectional view of the above embodiment.

FIG. 1 shows a micrometer representing a first embodiment of the present invention. FIG. 2 is a sectional view of said embodiment.

The micrometer 1 comprises a body 2 having a U-shaped frame 222 with an anvil 223 on its one end, a spindle 3 which is screwed into an end of the body 2 so as to axially move by screwing towards or away from the anvil 223, a detection means 4 for detecting the axial displacement of the spindle 3 based on the revolution of the spindle 3, and a digital display portion 5 for displaying a measurement based on a signal from the detection means 4.

The body 2 comprises, from its distal end in order, a distal cylinder 22, a proximal cylinder 21, and a spindle driving portion 23.

The distal cylinder 22 comprises a stem 221 attached to the mouth of its distal end, and a U-shaped frame 222 attached to its outside. The U-shaped frame 222 has, on its distal end, an anvil 223 at a position opposite to the spindle 3, has its proximal end attached to the distal cylinder 22, and has the digital display portion 5 on one surface.

The proximal cylinder 21 has its distal end connected to the distal cylinder 22, and has a female thread 211 on the inner surface of its proximal end, which engages with a male thread formed on the spindle 3. Close to the proximal end of the proximal cylinder 21 there is provided a slit 212 through which a nut 213 is inserted for fixation.

The spindle driving portion 23 is a layered structure around the proximal cylinder 21 which comprises, in the order of layering, an inner guide cylinder 231 and an outer guide cylinder 232, an outer sleeve 233 rotatably laid over the outer guide cylinder 232, a thimble 235 laid over the outer sleeve 233 with a friction spring 234 placed in between, and a cap cylinder 236 attached to the proximal ends of the outer sleeve and thimble 233, 235. The cap cylinder 236 is connected via thread engagement to the outer sleeve 233. The cap cylinder 236 has an axially extending guide groove 237 on its inner surface.

The spindle 3 penetrates the stem 221, and protrudes from the distal end of the body 2, and has a three-start thread 31 formed on the outer surface of its proximal end that engages with the female thread 211 formed on the inner surface of the proximal end of the proximal cylinder 21. The spindle 3 has on its proximal end a guide pin 32 which fits to a guide groove 237 formed on the cap cylinder 236. The spindle 3 has an axially extending fastening groove 40.

The detection means 4 comprises a stator 41 attached to the body 2, a rotor 42 placed opposite to the stator 41, the fastening groove 40 axially inscribed on the surface of the spindle 3, a fastening pin 422 attached to the rotor 42 for fitting to the fastening groove 40, and a pressing means 6 for pressing the fastening pin 422 towards the fastening groove 40.

The stator 41 is covered with the distal cylinder 22, and attached to the distal end of the proximal cylinder 21. There is provided a revolution blocking pin 441 between the stator 41 and the distal cylinder 22 which blocks the revolution of the stator. There is provided a spring 412 between the stator 41 and the distal cylinder 22 which forces the stator 41 to move distally.

The rotor 42 is attached to the proximal end of a rotor bush 421, which is rotatable independently of the spindle 3, so as to face the stator 41.

The rotor bush 421 is pressed proximally via a clamp collar 424 by an adjustment thread 425, which engages with the stem 221.

Figure 3:
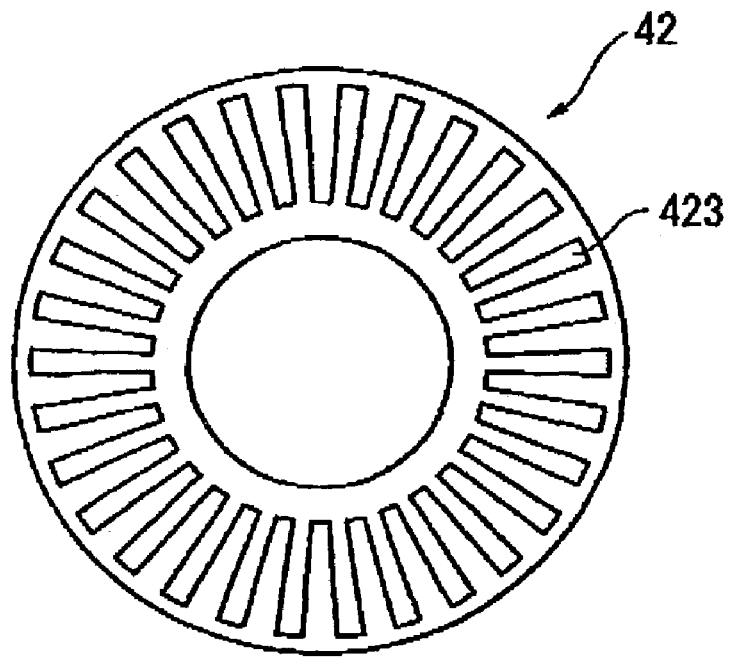
FIG. 3 shows a rotor of the embodiment.
Figure 4:
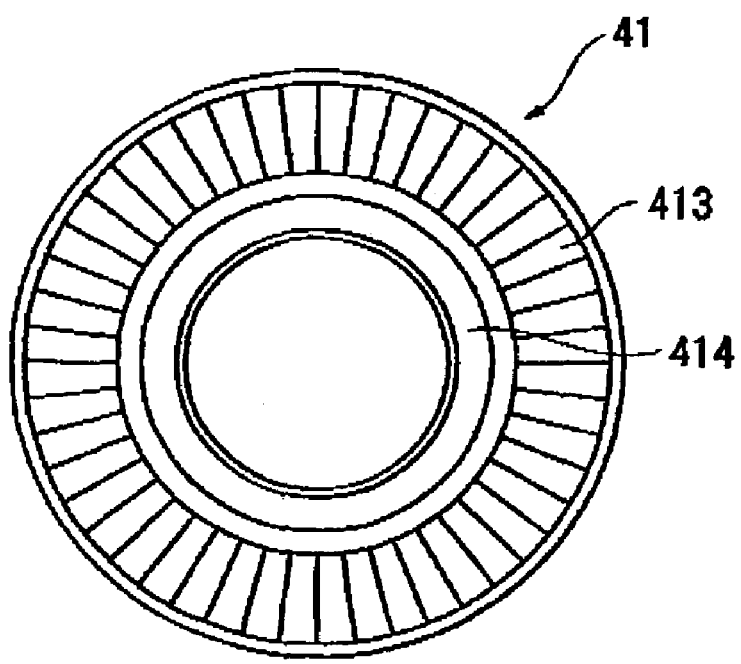
FIG. 4 shows a stator of the embodiment.

As shown in FIGS. 3 and 4, the rotor 42 and the stator 41 are placed with respect to each other such that an angle by which the former rotates relative to the latter can be determined by a change in the static capacity between a connecting electrode 423 on the former and signal receiving and signal transmitting electrodes 413, 414 on the latter. This particular embodiment contains the spindle 3 with a three-start male thread 31 formed thereupon, as illustrated in FIG. 2. The distance between each subsequent thread in FIG. 2 is indicated by reference number 32. However, the total moving distance of the spindle with a single rotation is indicated by reference number 33. Distance 33 is three times larger than distance 32, so that three threads separated by distance 32 are included in each three-start male thread 31, as shown in FIG. 2. Therefore, if an equivalent conventional signal transmitting electrode 414 contains eight strips of electrodes, the signal transmitting electrode of this embodiment contains 24 strips of electrodes, that is, three times as many as does the conventional signal electrode.

Figure 5:
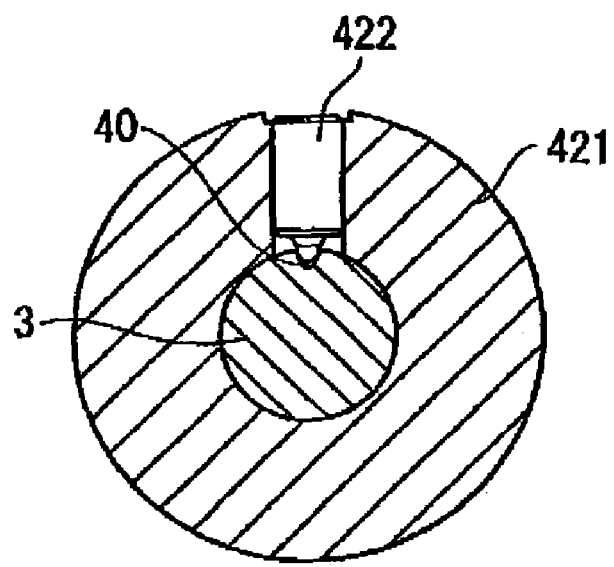
FIG. 5 shows how a fastening pin of the embodiment is set in place.

The fastening pin 422 is attached to the rotor bush 421 in such a manner as to fit to the fastening groove 40 axially inscribed on the spindle 3 and to be able to slide axially along the groove as shown in FIG. 5.

Figure 6:
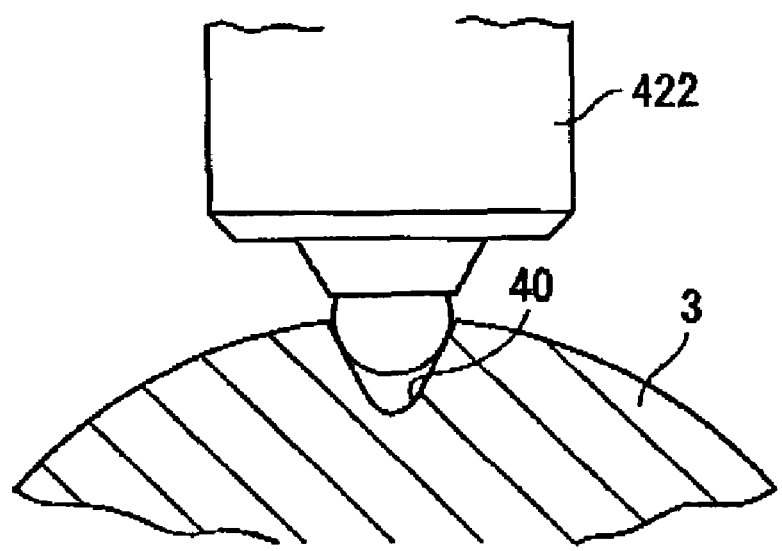
FIG. 6 is an enlarged view to show how the fastening pin of the embodiment is fitted to a groove.

The fattening pin 422 has a spherical end and the fastening groove 40 has a V-shaped profile as shown in FIG. 6.

Figure 7:
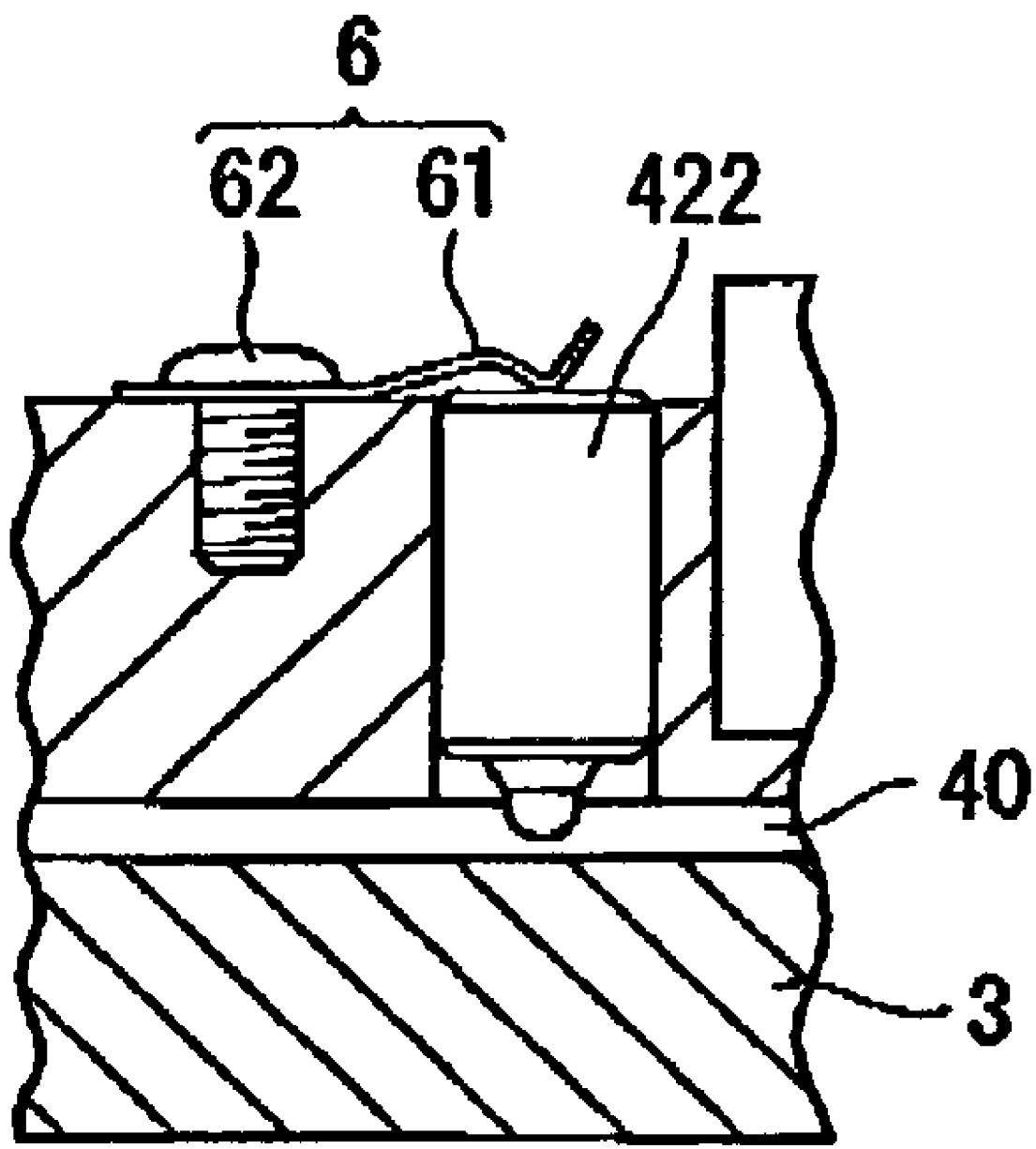
FIG. 7 shows a pressing means of the embodiment.

The pressing means 6 comprises an anchoring nut 62 and a spring plate 61: the anchoring nut 62 is screwed into the rotor bush 421 to be fixed theme so as to force the spring plate 61 to push the fastening pin 422 towards the fastening groove 40 as shown in FIG. 7.

With the micrometer 1 configured as described above, if the cap cylinder 236 or the thimble 235 is revolved, the revolution is transmitted to the spindle 3 via the guide pin 32 which fits to the guide groove 237. Then, the spindle 3 axially advances or retracts being moved via thread engagement with the proximal cylinder 21. When the spindle 3 is revolved, the revolution is transmitted to the rotor 42 via the fastening pin 422, which fits to the fastening groove 40. An angle by which the rotor 42 rotates relative to the stator 41 is read out by the stator 41, and a rotational angle of the spindle 3 is determined based on the read-out value. The axial displacement of the spindle 3 is calculated based on the rotational angle and the single turn axial displacement. The axial displacement of the spindle 3 is displayed on the digital display portion 5 as a measurement.

According to the micrometer 1 configured as described above, following advantages are ensure Because the male thread on the spindle 3 is based on a three-start thread 31, the distance it travels after one revolution is three times as much as that of a conventional spindle based on a single-start thread if other things being equal. If the revolution speed is assumed to be constant, with the micrometer of this embodiment, the spindle moves three times as fast as does a conventional micrometer. Thus, the micrometer 1 of this embodiment ensures good operability.

Because the fastening pin 422 is pressed by the plate spring 61 towards the fastening groove 40, it is possible to closely fit the fastening pin 422 to the fastening groove 40 with no gap inserted in between. Furthermore, the fastening pin 422 has a spherical end and the fastening groove 40 has a V-shaped profile. Thus, when the former comes into contact with the latter, the spherical end stably settles on the sloped wall surfaces of the latter with no gap placed in between. Thus, the fastening pin 422 can stably slide over the fastening groove 40. This will contribute to the improved precision of the micrometer 1.

The stator 41 of this embodiment has 24 strips of signal transmitting electrodes 414, in contrast with eight strips of signal transmitting electrodes encountered with a conventional stator. Thus, with this embodiment it is possible to detect the rotational angle of the spindle 3 at a higher precision than with the conventional micrometer. Because the male thread on the spindle 3 is based on a three-stars thread 31, the axial displacement of the spindle for a unit rotation angle is three times as much as that of a conventional spindle whose thread is based on a single-start thread. With this embodiment, because the detection precision of the rotation angle of rotor 42 relative to the stator 41 is sufficiently enhanced, the precision of measurement will not be impaired even if the single turn axial displacement is increased by employing the spindle 3 that has a three-start thread 31 formed thereupon.

It should be noted that the measuring device of the present invention is not limited to the above embodiment, and needless to say, various modifications thereof could be possible without departing from the scope of the present invention.

For example, the multiple-start thread 31 on the spindle 3 may take any integral number of starts, as long as the number is larger than one. If the multiple-start thread 31 on the spindle 3 includes a three-start thread, detection of the rotation angle of the rotor 42 relative to the stator 41 should be enhanced three times as high as that of an equivalent measuring device based on a single-start thread. If the multiple-start thread 31 on the spindle 3 includes a five-start thread, detection of the rotation angle of the rotor 42 relative to the stator 41 should be enhanced five times as high as that of an equivalent measuring device based on a single-start thread. Provided that the measuring device is constructed as described above, that measuring device will enable one to concurrently achieve high-speed axial displacement of a spindle and high precision measurement.

As another possible valiant of the present invention, the pressing means 6 is not always based on the plate spring 61 as in the present embodiment, but may take any form such as a hydraulic system, as long as it can supply a sufficient pressure on the fastening pin.

The detection means is not always based on the change of static capacity, but may occur in various forms such as one based on photoelectric effects.

The measuring device is not limited to micrometers, but may include any measuring devices based on the axial displacement of a spindle effected by the revolution of the spindle such as micrometer heads.

What is claimed is:

1. A measuring device for measuring a size of an object, comprising:
    a body having a U-shaped frame with an anvil on a distal end of the frame;
    a spindle that is screwed into a proximal end of the body via a multiple-start thread and axially advances and retracts by screwing towards or away from the anvil; and
    a display means for displaying a measurement based on a detection signal from a detection means that detects axial displacement of the spindle from revolution of the spindle, wherein the detection means includes:
    a stator attached to the body;
    a rotor placed opposite to the stator;
    a fastening groove axially inscribed on the spindle;
    a fastening pin attached to the rotor, the fastening pin including a cylindrical body that includes a flat side with a spherical distal portion protruding from the flat side, the spherical distal portion fitting into the fastening groove; and
    a pressing means for pressing the fastening pin towards the fastening groove,
    wherein the pressing means is a plate spring, and the plate spring has one end secured by a screw for adjusting a biasing force of the plate spring, and another end that presses against the cylindrical body.

2. The measuring device of claim 1, wherein a diameter of the cylindrical body is greater than a diameter of the spherical distal portion.

3. A measuring device comprising:
    a body having a U-shaped frame with an anvil on a distal end of the frame;
    a spindle which is screwed into a proximal end of the body via a multiple-start thread and moves by screwing towards or away from the anvil;
    a detection means for detecting the axial displacement of the spindle from the revolution of the spindle; and
    a display means for displaying a measurement based on a detection signal from the detection means, wherein the detection means includes:
    a stator attached to the body;
    a rotor placed opposite to the stator;
    a fastening groove axially inscribed on the spindle;
    a fastening pin attached to the rotor, the fastening pin including a cylindrical body that includes a flat side with a spherical distal portion protruding from the flat side, the spherical distal portion fitting into the fastening groove such that the fastening pin can slide in a direction parallel to a long axis of the spindle, and
    a pressing means having one end attached to the rotor and another end in the form of a plate spring that presses the fastening pin towards the fastening groove,
    wherein one end of the plate spring is secured by a screw for adjusting a biasing force of the plate spring, and another end of the plate spring presses against the cylindrical body.

4. A measuring device according to claim 3 wherein:
    the fastening groove has a V-shaped profile.

5. The measuring device of claim 3, wherein a diameter of the cylindrical body is greater than a diameter of the spherical distal portion.

6. A measuring device for measuring a size of an object comprising:
    a body;
    a spindle that is screwed into the body and axially advances and retracts by screwing with respect to the body;
    a fastening groove axially inscribed in the spindle;
    a stator attached to the body;
    a rotor placed opposite to the stator;
    a fastening pin having a cylindrical body that includes a flat side with a spherical distal portion protruding from the flat side and the fastening pin being attached to the rotor such that the fastening pin can slide in a direction parallel to the long axis of the spindle; and
    a pressing means having an end attached to the rotor and the other end in the form of a plate spring that presses the fastening pin towards the fastening groove,
    wherein one end of the plate spring is secured by a screw for adjusting a biasing force of the plate spring, and another end of the plate spring presses against the cylindrical body.

7. The measuring device of claim 6, wherein:
    the fastening groove has a V-shaped profile.

8. The measuring device of claim 6, wherein a diameter of the cylindrical body is greater than a diameter of the spherical distal portion.

* * * * *